G. B. UPTON & G. W. LEWIS.
FATIGUE TESTING MACHINE.
APPLICATION FILED NOV. 12, 1913.
1,156,726.
Patented Oct. 12, 1915.
4 SHEETS—SHEET 3.
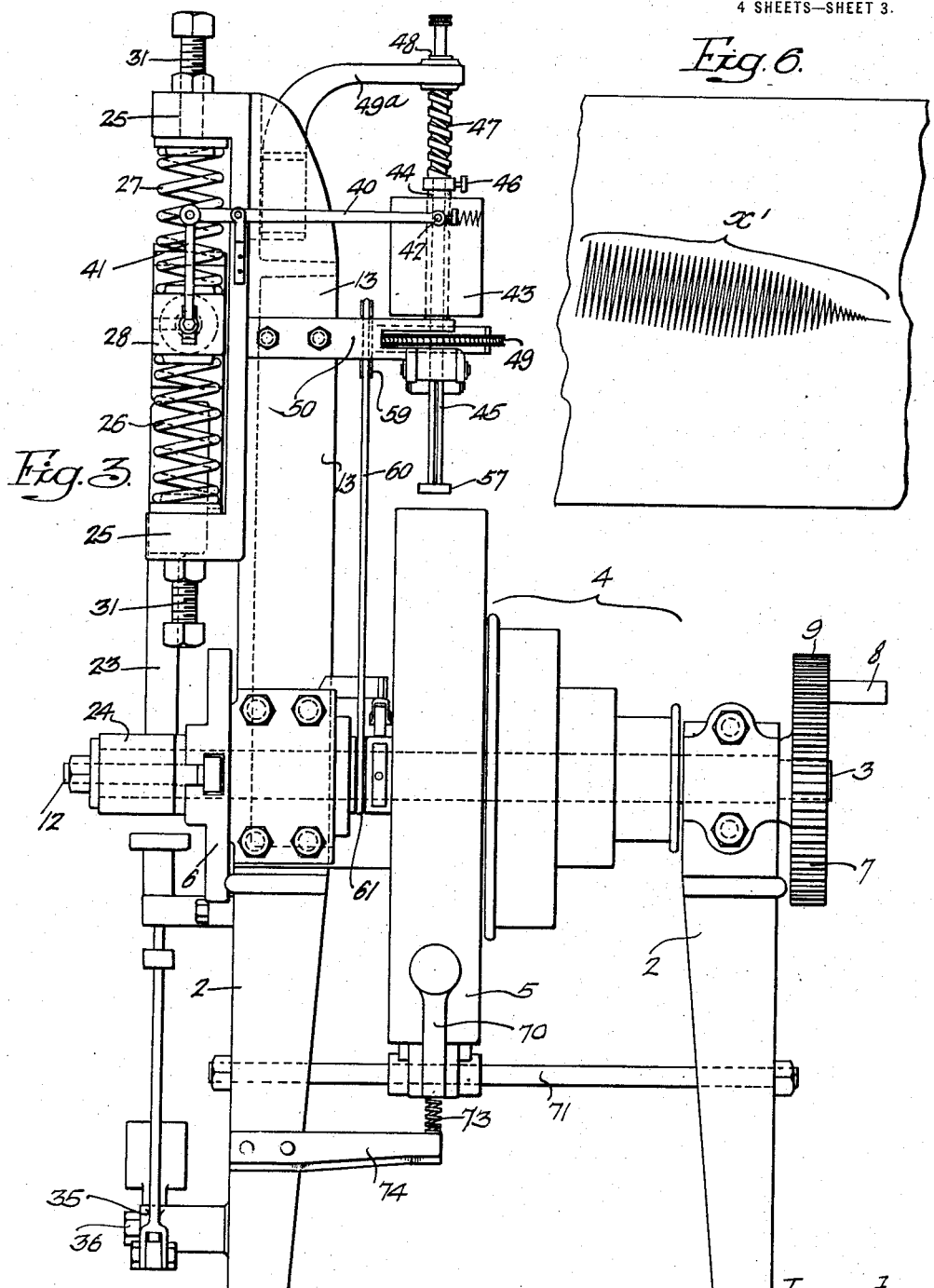

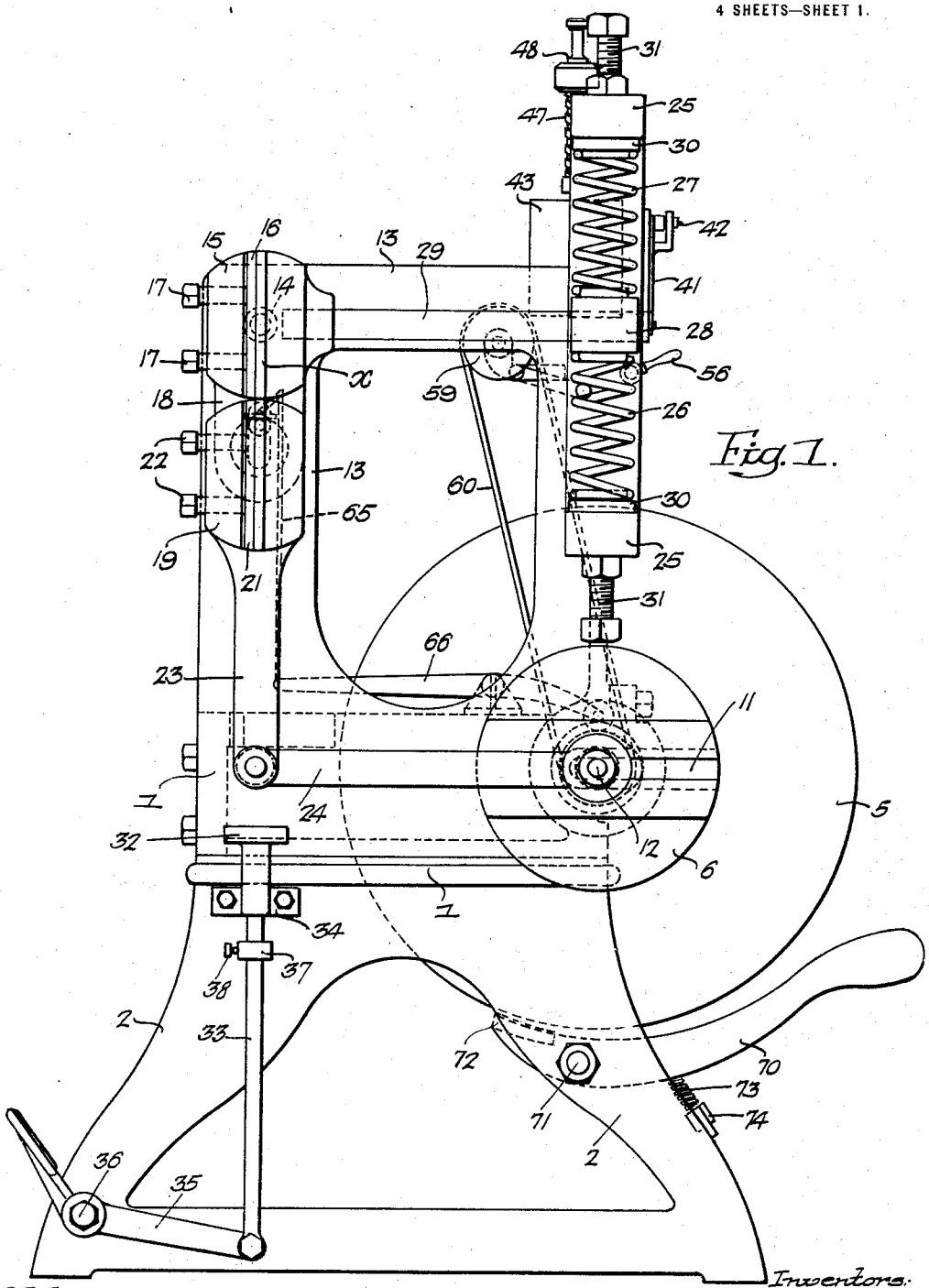

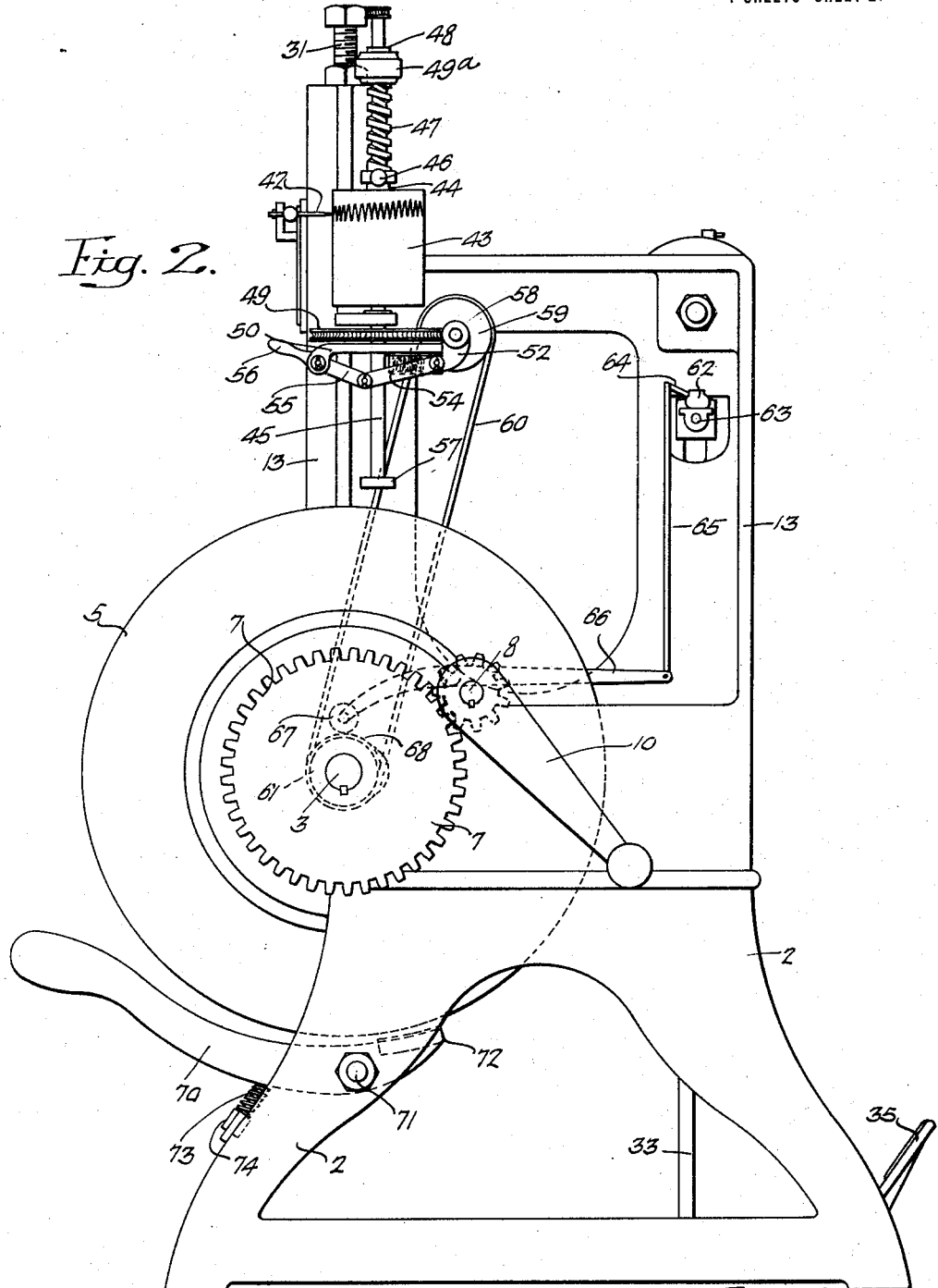

G. B. UPTON & G. W. LEWIS.
FATIGUE TESTING MACHINE.
APPLICATION FILED NOV. 12, 1913.
1,156,726.
Patented Oct. 12, 1915.
4 SHEETS—SHEET 4.
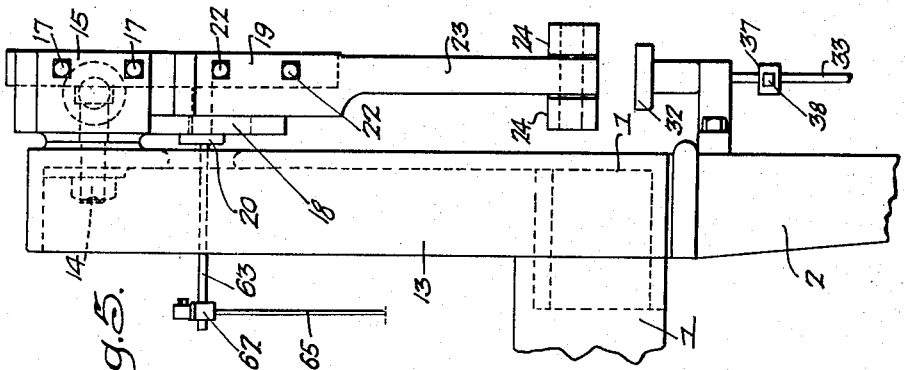
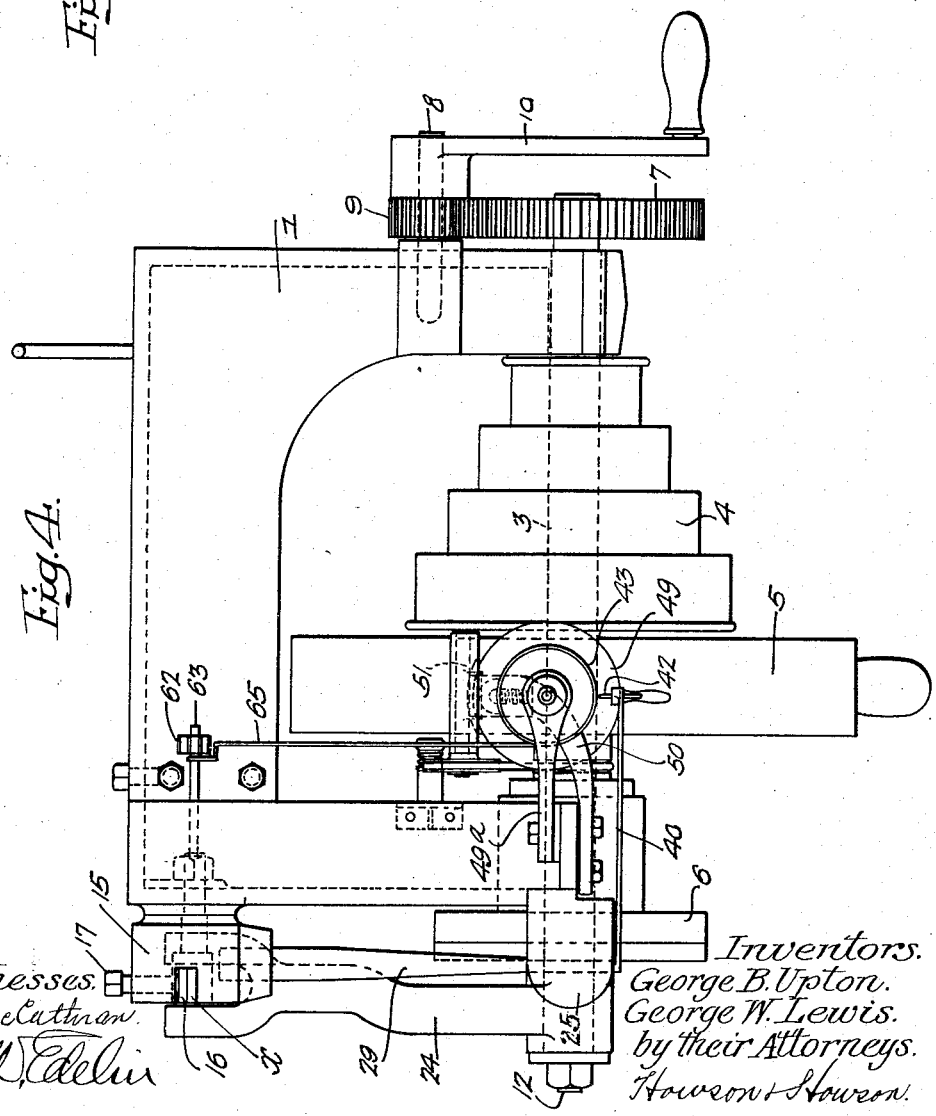

UNITED STATES PATENT OFFICE.

GEORGE B. UPTON, OF ITHACA, NEW YORK, AND GEORGE W. LEWIS, OF SWARTHMORE, PENNSYLVANIA, ASSIGNORS TO TINIUS OLSEN TESTING MACHINE COMPANY, OF PHILADELPHIA, PENNSYLVANIA, A CORPORATION OF PENNSYLVANIA.

FATIGUE-TESTING MACHINE.

1,156,726.     Specification of Letters Patent.     Patented Oct. 12, 1915.

Application filed November 12, 1913. Serial No. 800,614.

*To all whom it may concern:*

Be it known that we, GEORGE B. UPTON and GEORGE W. LEWIS, citizens of the United States, and residents of Ithaca, county of Tompkins, State of New York, and Swarthmore, county of Delaware, State of Pennsylvania, respectively, have invented certain Improvements in Fatigue-Testing Machines, of which the following is a specification.

One object of our invention is to provide a machine for testing the endurance of any material, and particularly metal bars, when subjected to bending stresses alternating in the direction of their application; the machine being so designed as to indicate visually, as well as to record, the amount of stress applied, and also the number of times the test piece is stressed.

Another object of the invention is to provide a machine which shall include mechanism for alternately bending a test piece in opposite directions to determine its resistance to fatigue, the invention contemplating novel means for applying and measuring the stress resulting from the bending.

We further desire to provide a testing machine having the above noted characteristics, with novel mechanism for adjusting the measuring and recording mechanism, as well as novel means whereby said mechanism shall be automatically thrown out of action when the test piece breaks.

We also desire to provide a fatigue testing machine with novel means for holding the piece under test and for applying thereto a predetermined load in order to cause a definite fiber stress in said piece; the invention further contemplating means for insuring that all pieces tested shall have the same length under stress.

These objects and other advantageous ends we attain as hereinafter set forth, reference being had to the accompanying drawings, in which:

Figure 1 is a front elevation of a machine constructed according to our invention; Fig. 2 is a rear elevation of the machine shown in Fig. 1; Figs. 3 and 4 are respectively a side elevation and a plan of the machine; Fig. 5 is a fragmentary side elevation illustrating certain details of the invention, and Fig. 6 is a plan of a portion of a record sheet, showing the record made by the machine.

In the above drawing 1 represents the frame or body of the machine which is supported on legs 2 and provides bearings for a substantially horizontal shaft 3, on which is fixed a cone pulley 4 or any other suitable device constituting or capable of being connected to, a source of power. Likewise fixed to the shaft is a fly-wheel 5, while at one end thereof is a crank disk 6 and at the opposite end a gear 7, all keyed or otherwise fixed to, so as to turn with said shaft.

Carried on a short spindle 8, journaled in the frame 1 is a pinion 9, meshing with the gear 7, and said spindle 8 is extended for the reception of a crank handle 10 whereby it, and therefore, the pinion 9 may be turned at will. The outer face of the crank disk 6 is provided with a radial slot 11, in which is adjustably mounted a crank pin 12, the arrangement being such that said pin may be clamped in the slot at any desired distance from the center of the shaft.

Projecting upward from that end of the main portion of the frame 1 adjacent the crank disk 6 is a rectangular standard 13, integral with or attached to the body of the frame and carrying adjacent one of its upper corners a short horizontally projecting stud or hinge pin 14, on whose outer end is rotatably mounted a jaw 15. The outer face of this latter has a transverse slot in which is a clamping plate 16, movable into holding engagement with a test piece *x* by means of a pair of set screws 17. Projecting downwardly from the back or inner portion of this jaw 15 is a vertically slotted plate 18 serving to some extent as a guide or movement limiting device for a second jaw 19 which has a rearwardly projecting pin or bolt 20 passing through the slot in this plate 18 and vertically slidable therein. This second jaw has a transverse slot extending in line with the slot of the jaw 15 and likewise containing a clamping plate 21, which may be set up into engagement with the test bar or piece by set screws 22. Integral with and projecting downwardly from the jaw 19 is an arm 23, whose lower end is operatively joined to the crank pin 12 by a connecting rod 24.

As shown in Fig. 3, the upwardly extending part 13 of the frame has two laterally projecting lugs 25, between which are mounted a pair of springs 26 and 27 whose adjacent ends engage the suitably formed end 28 of an arm 29 projecting horizontally from the upper jaw 15. These springs are accurately calibrated and are removably mounted between the end 28 of the arm 29 and the lugs 25 respectively, there being plates 30 interposed between each lug and the adjacent end of its spring, which plates are or may be acted upon by set screws 31 extending through said lugs, for the purpose of applying more or less compression to said springs.

Vertically under the arm 23 which projects downwardly from the jaw 19 is a supporting plate 32 carried on a rod 33 guided by a bearing 34 fixed to the side of one of the legs 2. This rod with the plate may be raised by a foot lever 35 pivoted to the frame at 36, and the distance to which it can be moved upwardly by said lever is limited by a collar 37 fixed to it by a set screw 38 so that the plate 32 cannot be moved up beyond a certain point. Said plate is designed to raise the arm 23 and with it the jaw 19 so that the upper surface of the latter may always be brought to within a constant distance from the lower face of the jaw 15 so that there is always the same free length of the test piece between said jaws.

Pivoted to the portion 13 of the frame adjacent one side of the spring 27 is a small lever 40, whose short arm is connected by a bar 41 with the head or end 28 of the arm 29. The long arm of this lever carries a pencil point 42 designed to form a record on a sheet of paper mounted on a cylindrical drum 43, having a hollow spindle 44 which may be clamped to a vertically extended rod 45 by a set screw 46. This rod, above the set screw, is threaded as shown at 47 and passes through a correspondingly threaded nut 48 fixed in an overhanging portion 49ª of frame standard 13, while below said threaded part the rod passes through the spindle 44 of the drum and through a worm wheel 49, journaled in a bracket 50 projecting laterally from the portion 13 of the frame. Below and for a short distance above this bracket the rod 45 is provided with a rectangular keyway for the reception of a spline whereby it is operatively connected to the worm wheel 49, while being free to slide through the same.

For driving the worm wheel we provide a worm 51 mounted in suitable bearings on a slide 52 guided in suitable ways provided in the bracket 50 so as to be capable of moving to and from the worm wheel 49 to bring the worm into and out of mesh with the same. Said slide is normally drawn toward the worm wheel by a spring 53 and in order to automatically disconnect it under certain conditions we provide a toggle, one member of which is formed by a pair of links 54. One end of each of these latter is pivoted to the slide 52, while the other end is pivoted to one branch of a forked lever 55, pivoted to a part of the bracket 50 and having a projecting handle 56;—the arrangement of parts being such that the spring 53 normally holds the toggle in its broken position with the worm in mesh with the teeth of the worm wheel and the handle 56 elevated. For disconnecting these parts we provide a head or abutment 57 on the rod 45 so designed that when said rod has been raised to a predetermined extent, this head will engage the toggle members 54 and 55 and straighten them, thus forcing the slide 52 outwardly and moving the teeth of the worm out of mesh with those of the worm wheel. For driving the worm spindle 58 we fix thereto a pulley 59 and connect it by a belt 60 to a second pulley 61 fixed on the shaft 3.

In order to make a record of the number of revolutions of the main shaft 3, we provide a recording counter 62 carried on a bar 63 projecting concentrically from and attached to the pin or bolt 20, which, as above noted, is fixed to the lower jaw 19; and provide this instrument with an arm 64 which when oscillated through a small angle, causes operation of said counter. Through a link 65 this arm is connected to one arm of a lever 66 whose opposite end carries a roller 67 bearing upon a suitable cam 68 on the shaft 3. This cam is of such design that once in every revolution of the shaft the lever 66 is oscillated on its pivot and through the arm 64 is caused to operate the counting instrument 62.

In order to stop operation of the mechanism in a short time after the power has been cut off from the same, we provide a hand or other suitable form of brake shown as operative on the fly-wheel 5 and consisting of a lever 70 pivotally mounted on a transversely extending rod 71 connecting two legs of the frame. The other arm of this lever is provided with a brake shoe 72, normally held out of engagement with the fly-wheel by means of a spring 73 carried by a bracket 74 mounted to one of the legs 2.

When it is desired to operate the machine, a sheet of paper is mounted on the recording drum 43 in any desired and suitable manner, and one end of a bar of material to be tested (preferably of a rectangular section) is clamped to the jaw 15 by inserting it in the slot thereof and turning up the set screws 17. It is to be understood that the lower half of the test bar extends in the line of the slot of lower jaw 19, which is raised by depressing the outer end of the foot lever 35 to within a predetermined short distance of the upper jaw determined by the setting of the limit collar 37 relatively to the bearing 34. The screws 22 may now be set up, thus causing the second end of the test piece to be rigidly gripped by the lower jaw.

The point of the pencil 42 being in engagement with the upper part of the sheet of the recording drum, the machine is next adjusted or set to cause some predetermined stress to be exerted on the test piece at each vibration. Since the springs 26 and 27 will require a definite load to compress or elongate them through a predetermined distance, for example one inch, the crank pin 12 is adjusted in its slot 11 until one revolution of the crank as caused by means of hand lever 10, the spindle 8 and gear 9, will cause the pencil 42 to make a substantially vertical line on the record sheet of the drum 43 of such a length as would correspond to the load desired on the test piece. For example, if it is desired to apply to the test piece a stress of one hundred thousand pounds to the square inch and the strength of the springs and proportions of the lever 40 were such that a fiber stress of fifty thousand pounds to the square inch on the test piece caused a pencil movement of half an inch, then the crank pin 12 would be moved to such a distance from the center of the crank as would cause the pencil to draw a line on the record sheet one inch in length each time said crank was given a complete revolution. Thereafter the handle 10 is removed and power is applied to the shaft 3, in the present instance through the cone pulley 4, so that at each revolution of the crank 6, the jaw 19 through its arm 23 and the connecting rod 24, is caused to exert a certain bending force on the test piece. At the same time the jaw 15 is turned by this strain on its pivot or hinge pin 14 against the action of the springs 26 and 27 exerted on the arm 29. The lever 40 through the link 41 is therefore oscillated on its pivot to move the pencil 42 over the card or record sheet and at the same time the worm wheel 49 is driven by the worm 51 from the main shaft through the belt 60 and pulleys 61 and 59, it being understood that the toggle formed by the members 54 and 55 has been previously moved to its broken position to bring said worm into mesh with the worm wheel. As a consequence, each complete cycle of operations; that is, the bending of the test piece from a straight to a bowed position in one direction to a bowed position in an opposite direction and back to the original position, is represented, for example, by an upwardly extending line half an inch long, to whose upper end is connected a downwardly extending line one inch in length having an upwardly extending line half an inch long continued from its lower end. The number of cycles, as shown by the number of revolutions of the shaft 3, is indicated by the counting instrument 62, and as the drum 43 is revolved it is moved axially upward owing to the engagement of the screw 47 on the spindle 45 with the fixed nut 48. The resulting continuous wavy line formed by the pencil has the appearance indicated at $x'$ in Fig. 6, and the extreme width of its path of movement, as above noted, is a direct measure of the stress applied to the piece under test.

Owing to the simultaneous revolution and upward movement of the drum and its record sheet, the line $x$ is drawn helically, being inclined downwardly from the upper part of said sheet around the same for a distance depending on the number of cycles through which the test piece resists the stress applied without breaking. Under actual operative conditions the throw of the pencil remains substantially constant for a greater or less time, becoming less, however, as the outer fibers of the bar under test gradually break, until shortly before the piece breaks as a whole, the pencil throw rapidly decreases and finally ceases altogether when breakage occurs. At this time the lower jaw 19 drops, although it is guided by its pin or bolt 20 in the slotted plate 18 attached to the jaw 15, the lower end of its arm 23 striking and resting upon the plate 32. This downward movement of said jaw 19 naturally carries with it the rod 63 and the counting instrument 62, thus also moving downwardly the link 65 and so turning the lever 66 on its pivot as to raise its roller 67 out of the path of the cam 68. As a consequence, operation of the instrument 62 ceases with the breakage of the test piece, so that even though shaft 3 should continue to be driven, it is possible to directly read on said instrument the number of revolutions of said shaft and hence the number of times the bending stress was applied to the test piece before failure occurred.

The continued operation of the shaft ordinarily continues to turn the worm wheel 49, so that after breakage of the test piece, the drum 43 continues to rotate and at the same time to move upwardly until the head 57 of the spindle 45 strikes the toggle formed by the members 54 and 55. Such engagement straightens said toggle and moves the slide 52 away from the worm wheel 49, thus disengaging the worm 51. The revolution of the drum is thus stopped and owing to the fact that the worm wheel 49 with the spindle 45 is now free to turn, the weight of the drum and said spindle causes the screw 47 to move downwardly through the nut 48 until the parts occupy their normal positions prior to starting, as shown in Fig. 2. In order to again put the drum into operation it is only necessary to draw the handle 56 upwardly so as to break the toggle 55—54, when the worm 51 again comes into engagement with the worm wheel. By loosening the set screw 46 the drum 43 may be turned to bring the pencil into engagement with any desired part of the record sheet thereon.

From the above description, it will be noted that by means of our machine, we are enabled to apply a predetermined deformation to a piece under test any desired number of times, and through the agency of springs and recording mechanism to measure the resulting stress applied. It is also to be noted that the free length of the test piece between the jaws is fixed at the same value for all tests, being, for example, about one-tenth of an inch, while the springs 26 and 27 may be set under any desired initial tension, it being essential, however, that at maximum throw of the arm 29 neither spring shall move out of engagement with the head or end 28 of said arm. The flywheel 5 is designed to carry the machine over the points of maximum throw and the speed of revolution of the shaft may be varied between any desired limits, for example, from one hundred to six hundred and fifty revolutions per minute.

We claim:

1. A fatigue testing machine consisting of two jaws for holding a piece to be tested; arms respectively projecting from said jaws, one parallel with gripping faces of the jaws and one substantially at right angles thereto; means for oscillating the arm of one of the jaws to alternately bend the test piece in opposite directions; and springs operative on opposite sides of the arm of the other jaw for opposing movement thereof.

2. A fatigue testing machine consisting of a vertical supporting standard; two oscillatory jaws, one above the other, for holding a piece to be tested, the upper jaw being pivoted to the standard; means for oscillating the lower jaw to alternately bend the test piece in opposite directions; an arm projecting from the upper jaw; and springs operative on said arm for opposing movement of the lower jaw.

3. A fatigue testing machine consisting of a supporting frame; a jaw pivoted to said frame and having a slotted extension; an arm projecting from said jaw; springs confined between portions of said frame and said arm for opposing movement thereof; a second jaw having a portion operative in the extension of the first jaw; and means for oscillating the second jaw.

4. A fatigue testing machine consisting of a supporting frame; a jaw pivoted to a substantially vertical portion of said frame; a second jaw; means on one of said jaws for limiting movement of the other away from it, each of said jaws having a slot across its face, and said slots being in line; springs for opposing movement of the first jaw on its pivot; and means for mechanically oscillating the second jaw.

5. A fatigue testing machine consisting of a vertical supporting standard; two oscillatory jaws, one above the other for holding a piece to be tested, the upper jaw being pivoted to the standard; means for oscillating the lower jaw to alternately bend the test piece in opposite directions; an arm projecting from the upper jaw; and springs operative on said arm for opposing movement of the lower jaw; with means for limiting downward movement of the lower jaw when the test piece breaks.

6. A fatigue testing machine including two jaws each having a projecting arm; a supporting frame on which one of said jaws is pivotally mounted; a crank; means for operatively connecting said crank to the arm of one jaw; and two springs respectively operative on opposite sides of the arm of the second jaw.

7. A fatigue testing machine including a supporting structure; a jaw pivoted thereto; springs for opposing movement of said jaw; a second jaw operatively connected to the first jaw through a piece under test; means for oscillating the second jaw; with a member fixed to one jaw and movably connected to the other for limiting movement of the second jaw when the test piece breaks.

8. The combination in a fatigue testing machine of a driving shaft; two jaws for holding a piece to be tested; mechanism driven by said shaft for oscillating one of the jaws, said latter jaw being connected to the other jaw solely through the test piece; a counting instrument carried by said first jaw; with mechanism driven by shaft for actuating said instrument and including means for operatively disconnecting the shaft and the instrument when the test piece breaks.

9. A fatigue testing machine including a supporting structure; a jaw pivoted thereto; springs for opposing movement of said jaw; a second jaw operatively connected to the first jaw through a test piece; a slotted plate attached to the first jaw; and a pin on the second jaw passing through the slotted plate for limiting movement of the latter jaw when the test piece breaks.

10. The combination in a fatigue testing machine of two jaws for holding a piece to be tested; means for oscillating said jaws to alternately bend the test piece in opposite directions; and a member having a definite limited movement mounted in position to engage one of the jaws and free to move it to within a predetermined constant distance of the other when it is desired to clamp a test piece therein.

11. The combination in a fatigue testing machine of a supporting structure; a jaw pivoted thereto; a second jaw mounted below the first jaw; a slotted projection connected to the first jaw; a pin connected to the second jaw and slidably guided in the slot of said projection; an arm connected to the second jaw: mechanism connected to said arm for oscillating the jaw; and a device for moving the second jaw to within a constant predetermined distance of the first jaw when it is desired to clamp a test piece in said jaw.

12. The combination in a fatigue testing machine of a supporting structure; a jaw pivoted thereto; a second jaw mounted below the first jaw; a slotted projection connected to the first jaw; a pin connected to the second jaw and slidably guided in the slot of said projection; an arm connected to the second jaw; mechanism connected to said arm for oscillating the jaw; and a device for moving the second jaw to within a constant predetermined distance of the first jaw when it is desired to clamp a test piece in said jaws, the same consisting of a vertically movable member mounted under the arm and having a predetermined range of movement; with a foot actuated element connected to said member.

13. The combination in a fatigue testing machine of two jaws for holding a piece under test; means for oscillating one of the jaws to alternately bend the test piece in opposite directions; means for opposing a definite force to movement of the other jaw while permitting such movement; a member attached to said latter jaw so as to be moved thereby; a rotary drum for supporting a record sheet in position to be marked by said member under operating conditions; means for axially moving said drum as it is rotated; and a device for automatically stopping rotation of the drum after it has made a predetermined number of revolutions.

14. The combination in a fatigue testing machine of a supporting structure; a jaw pivoted thereon; a second jaw connected to said first jaw solely through a piece under test; means for oscillating the second jaw; an arm connected to the first jaw and projecting in a line substantially at right angles to the line of the test piece; and two oppositely disposed springs operative on said arm to oppose movement thereof.

15. The combination in a fatigue testing machine of a supporting structure; a jaw pivoted thereon; a second jaw connected to said first jaw solely through a piece under test; means for oscillating the second jaw; an arm connected to the first jaw; two oppositely disposed springs operative on said arm to oppose movement thereof; a marking lever connected to the arm; and means for supporting a record sheet in position to coöperate with the marking lever to form a record of the movements of the arm.

In testimony whereof, we have signed our names to this specification, in the presence of two subscribing witnesses.

GEORGE B. UPTON.
GEORGE W. LEWIS.

Witnesses to the signature of George B. Upton:
CLARENCE D. TARBELL,
MILDRED H. SMITH.

Witnesses to the signature of George W. Lewis:
THORNTEN Y. OLSEN,
HENRY BARNEY.

Copies of this patent may be obtained for five cents each, by addressing the "Commissioner of Patents, Washington, D. C."